United States Patent [19]

Suzuki et al.

[11] Patent Number: 5,188,788
[45] Date of Patent: Feb. 23, 1993

[54] PROCESS FOR PRODUCING CELLULOSE TRIACETATE FILMS

[75] Inventors: Yuji Suzuki; Takeshi Yamazaki, both of Kanagawa, Japan

[73] Assignee: Fuji Photo Film Co., Ltd., Kanagawa, Japan

[21] Appl. No.: 736,342

[22] Filed: Jul. 26, 1991

[30] Foreign Application Priority Data

Jul. 30, 1990 [JP] Japan .................................. 2-199086

[51] Int. Cl.$^5$ ........................ B29C 41/26; B29C 41/44
[52] U.S. Cl. ...................................... 264/169; 34/110; 34/113; 264/39; 264/207; 264/217; 264/211.11
[58] Field of Search ................. 264/207, 217, 39, 216, 264/169, 211.11; 34/110, 113

[56] References Cited

U.S. PATENT DOCUMENTS

| | | | |
|---|---|---|---|
| 2,319,052 | 5/1943 | Fordyce et al. | 264/217 |
| 2,607,704 | 8/1952 | Fordyce et al. | 106/190 |
| 2,739,069 | 3/1956 | Fordyce et al. | 106/196 |
| 3,239,652 | 3/1966 | Price | 34/110 |
| 4,026,978 | 5/1977 | Mungle et al. | 264/217 |
| 4,541,972 | 9/1985 | Wermik | 264/207 |

FOREIGN PATENT DOCUMENTS 556951 10/1943 United Kingdom ................ 264/212

Primary Examiner—Jan H. Silbaugh
Assistant Examiner—Mathieu Vargot
Attorney, Agent, or Firm—Sughrue Mion, Zinn Macpeak & Seas

[57] ABSTRACT

A process for producing cellulose triacetate films that is capable of not only suppressing the growth of foreign matter on transport rollers, but also markedly reducing the necessary number of cleaning operations. The process includes steps of casting a solution of cellulose triacetate onto a support having it surface cooled at 20° C. or below, drying and cooling the solution cast onto the support to solidify the cast solution, separating the subsequently solidified film from the support, and transporting the film while it dries on transport rollers. In accordance with the invention, for a weight proportion of the solvents in the film as separated from the support of at least 40 wt %, the surface of the transport rollers is made of a material having a surface energy of no more than 80 dynes/cm at 20° C.

9 Claims, 3 Drawing Sheets

PROCESS FOR PRODUCING CELLULOSE TRIACETATE FILMS

BACKGROUND OF THE INVENTION

The invention relates to a process for producing cellulose triacetate films that are particularly suitable for use as supports of photographic materials. More specifically, the invention relates to a process for producing a cellulose triacetate film, which process includes steps of casting a solution of cellulose triacetate (herein referred to as a "dope") onto an endless band or drum (herein referred to collectively as a "support") having its surface cooled to 20° C. or below, drying and cooling the cast solution on the support to solidify the same, separating the solidified film from the support, and thereafter transporting the film while it dries on transport rollers.

A conventional process for producing cellulose triacetate films by casting on a drum is depicted in FIG. 3(a). A cellulose triacetate film 3 cast onto a rotating drum 5 from a casting die 1 is dried to some extent on the drum 5, from which a film 4 is stripped and subsequently transported on transport rollers $7_1$, $7_2$, $7_3$, ... while it is dried on both sides.

A conventional process for producing cellulose triacetate films by casting on an endless band is depicted in FIG. 3(b). A cellulose triacetate film 3 emerging from a casting die 1 is cast onto an endless band 6 wound onto two rotating drums and then dried to some extent on the band 6, from which a film 4 is stripped and subsequently transported on transport rollers $7_1$, $7_2$, $7_3$, $7_4$, ... while it is dried on both sides.

For increasing the production rate of the processes described above, it is effective to maximize the proportion of residual solvents in the cellulose triacetate film 3 so that the film 4 can be separated from the support such as drum 5 or band 6. Many proposals have been advanced to implement this approach (see, for example, U.S. Pat. Nos. 2,221,019, 2,607,704, 2,739,069, Examined Japanese patent publications Nos. 9074/1970 and 48862/1979, as well as Unexamined Published Japanese patent application No. 115035/1987).

Stripping the cellulose triacetate film 3 from the support 5 or 6 to form the film 4 can be accomplished by the combination of the following two steps: evaporating the solvents by drying on the support 5 or 6, and cooling the support until its surface temperature drops to a level that is below the solidifying point as determined by the amount of residual solvents in the film at the point of separation from the support.

In practice, however, when the solution of cellulose triacetate emerging from the casting die 1 is cast as the film 3 onto the support 5 or 6, the solution causes a "neck-in" problem in the cast area (indicated by 2 in FIG. 2(a)), and, as shown partially enlarged in FIG. 2(b), the edge on either side of the cast area 2 will eventually collect on either side of the film 3 to increase its thickness. As shown in FIG. 1(b), the film 4 subsequently separated from the support will have an undesirably thick portion in area B on either side of the film where it is in contact with the transport roller 7 and which is about 30 mm wide.

After being separated from the support 5 or 6, the film 4 is rapidly dried on both sides. However, in the early stage of transport by rollers where the film retains a high proportion of residual solvents, the temperature of the film 4 at the edge on either side will increase due to the heat transferred from the nearest transport roller, and hence the film becomes viscous again (becomes a dope) in those areas and sticks to that transport roller to foul it.

This fouling of the transport roller is most likely to occur in area B (see FIG. 1) where the surface temperature of that roller is particularly high.

The fouling deposit on the transport roller will grow with time until it is dislodged from that roller and redeposited as foreign matter on the next roller. The resulting foreign matter can cause indentations and other surface defects that impair the appearance of the final film.

Conventionally, this problem has been dealt with manually by the operator who periodically cleans the transport rollers during production. The common method of cleaning the transport rollers is to manually wipe off the dirt on the rollers with a cloth wetted with an organic solvent such as methylene chloride or methanol. A disadvantage of this method is that the operator must take the risks associated with inhaling noxious gases from the solvent. As another problem, the film being transported during the cleaning operation cannot be processed to a final product while the cleaning operation is being performed, so that the efficiency of production will decrease considerably if the cleaning operation is performed frequently.

SUMMARY OF THE INVENTION

The present invention has been achieved under these circumstances, and has as an object providing a process for producing cellulose triacetate films that is capable of not only suppressing the growth of foreign matter on transport rollers but also markedly reducing the necessary number of cleaning operations.

This and other objects of the present invention are attained by a process that comprises the steps of casting a solution of cellulose triacetate onto a support having its surface cooled to 20° C. or below, drying and cooling the cast solution on the support to solidify the solution, separating the solidified film from the support, and transporting the film while it dries on transport rollers, which process is characterized in that when the weight proportion of the solvents in the film as separated from the support is at least 40 wt %, the surface of the transport rollers is made of a material having a surface energy $\sigma$ of up to 80 dynes/cm at 20° C.

DESCRIPTION OF THE PREFERRED EMBODIMENTS

The solution of cellulose triacetate to be cast by the process of the present invention is a dope such that the sum of the concentrations of cellulose triacetate and any other components that will become a solid after drying is in the range of 18-35 wt %, with the proportion of solvents other than methylene chloride in the solvent system being in the range of 8-25 wt %.

In order to permit the solution of cellulose triacetate to separate from the support fast enough to increase the production efficiency, the support to be used in the present invention has its surface cooled to a temperature of 20° C. or below.

In the present invention, the weight proportion of solvents in the film as separated from the support is specified to be at least 40 wt %. If the average proportion of residual solvents is within the range of 40-50 wt %, the film will not readily become viscous even if it is heated and hence it will not produce a fouling deposit. However, it was determined by experimentation that when the average proportion of residual solvents in the film was at least 40 wt %, the film in area B of a transport roller contained more solvents and, in addition, its temperature was high enough to cause the deposition of fouling matter.

In the present invention, it is necessary to use such transport rollers that their surface is made of a material having a surface energy $\sigma$ of up to 80 dynes/cm at 20° C. Conventionally used stainless steel transport rollers have a surface energy of at least 100 dynes/cm at 20° C., which is significantly higher than 80 dynes/cm. However, to attain the objects of the present invention, it is necessary to use transport rollers that have surface energies not higher than 80 dynes/cm at 20° C. Desirably, the surface energy of the transport rollers to be used in the present invention should not exceed 50 dynes/cm at 20° C., more desirably not exceeding 30 dynes/cm at 20° C.

Materials having surface energies of not more than 80 dynes/cm at 20° C. include ceramics and glass ($\sigma=60-70$ dynes/cm at 20° C.), materials having surface energies of not more than 50 dynes/cm at 20° C. include polyethylene terephthalate films ($\sigma=40-45$ dynes/cm at 20° C.), materials having surface energies of not more than 30 dynes/cm at 20° C. include fluorine resins ($\sigma=20-25$ dynes/cm at 20° C.).

Surface energy can be calculated by the Fowkes-Owens equation from the angles of contact with water and methylene iodide.

By forming the surface of transport rollers of the materials described above, foreign matter that is deposited on the surface of transport rollers can be prevented from growing to an undesired size.

Figure 1A:
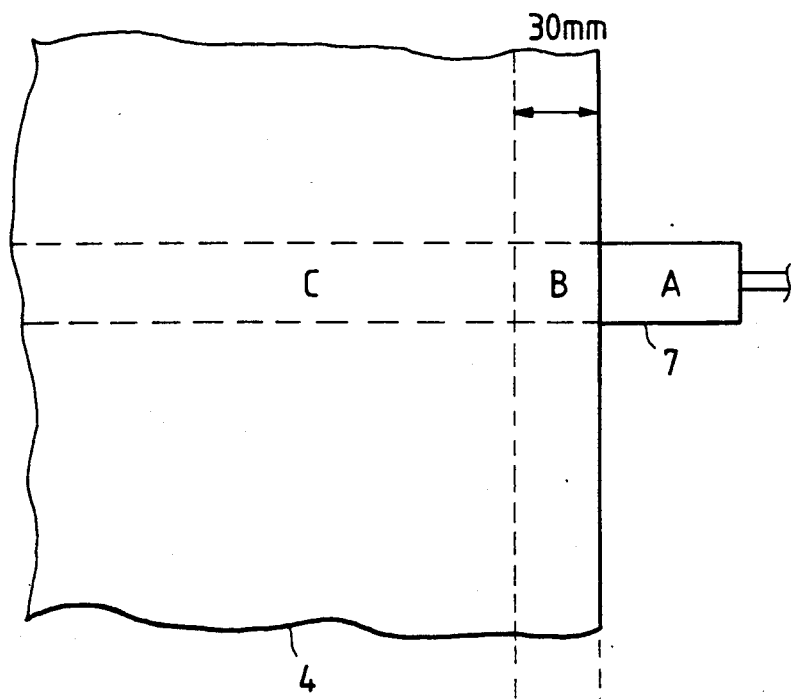
FIGS. 1(a) and 1(b) are a plan view and a cross-sectional view, respectively, showing areas of a roller and a film where a fouling deposit of the type that is to be dealt with by the present invention is most likely to occur.
Figure 1B:
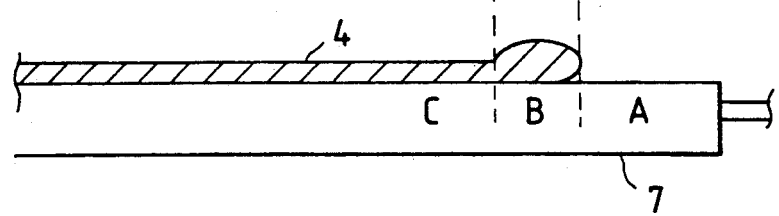
Figure 2A:
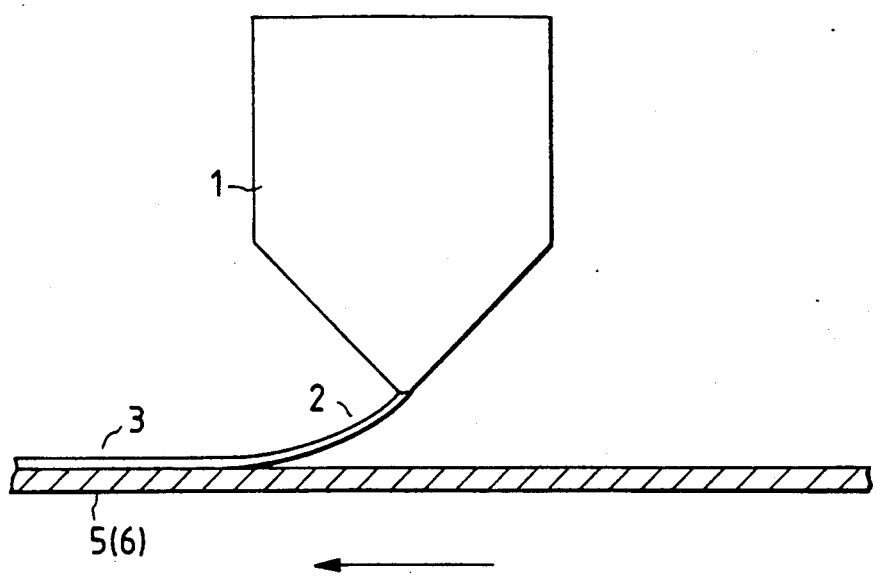
FIGS. 2(a) and 2(b) are a side view and a plan view, respectively, for illustrating the phenomenon of "neck-in" that occurs in the neighborhood of a casting die from which a solution of cellulose triacetate emerges.
Figure 2B:
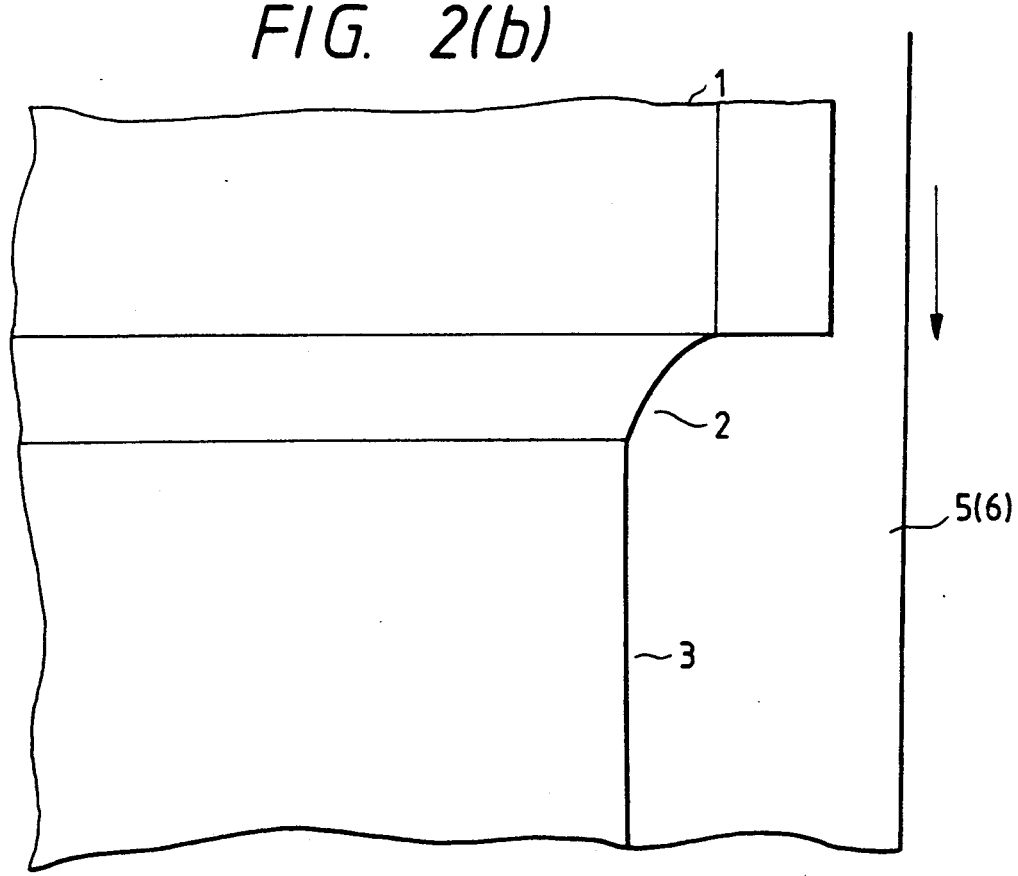

There is no particular need to use such surface materials over the entire width of each transport roller. That is, such surface materials need only be applied to those areas where dirt is more likely to be deposited, for example, in areas that correspond to area B indicated in FIG. 1 where the side edges of the film are transported. Alternatively, three or more surfacing materials may be applied across the roller width, with the surface energy being varied progressively in accordance with the likelihood with which dirt is deposited on the roller surface.

There also is no particular need to apply the specified surface materials to all of the transport rollers in the system, but instead they need only be used on selected rollers on which foreign matter is most likely to be deposited.

The following Examples are provided for the purpose of further illustrating the present invention, but are in no way to be taken as limiting.

EXAMPLE 1

Figure 3A:
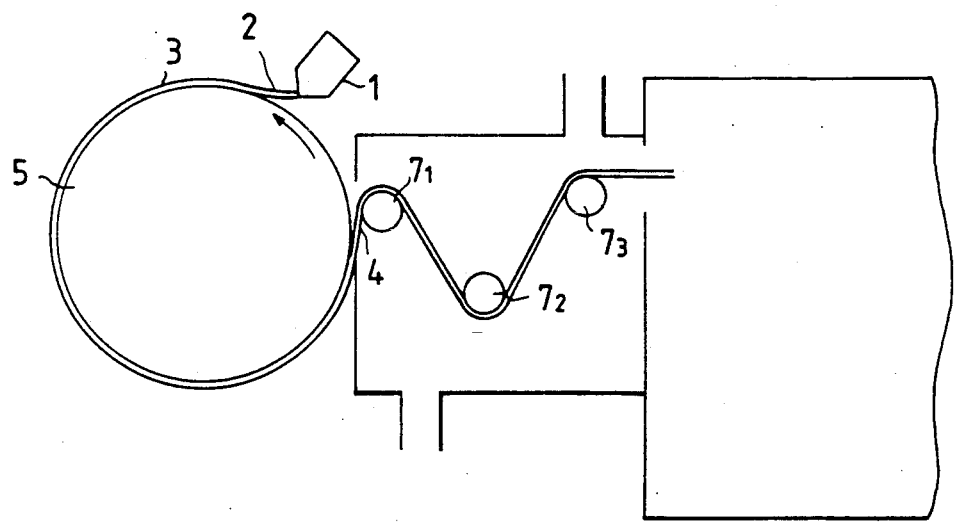
FIG. 3(a) is a side view depicting a process of the invention for producing a cellulose triacetate film by casting on a drum.

An experiment was conducted on the material of the transport rollers under the following conditions. The process of production of cellulose triacetate films was of the type shown in FIG. 3(a):

Dope:
    Solutes: cellulose triacetate and a small amount of plasticizer
    Solvent: liquid mixture of methylene chloride and methanol (83.5/16.5 at. wt. ratio)

Concentration: 21.5 wt %

Film thickness: 135 $\mu$m (after drying)

Surface temperature of support: 14.5° C.

Average proportion of residual solvents in film as separated from the support: 63 wt %

Temperature of drying during transfer by rollers: 60° C.

Rollers $7_1$, $7_2$ and $7_3$ were made of the same material. The surface temperature of roller $7_1$ was measured during the production of cellulose triacetate films. The results were as follows (for the definition of each area, see FIG. 1(a)):

Area A: $\geq 35°$ C.
Area B: 25-28° C.
Area C: $\leq 10°$ C.

The surfacing material of the rollers was changed to various types, but the surface temperature profile was substantially the same as above.

The severity of dirt deposition was the highest with roller $7_1$ which was used to transport the film when it contained the largest volume of volatiles, and the severity decreased in the order of rollers $7_2$ and $7_3$.

Comparative Example 1

When conventional stainless steel transport rollers ($\geq 100$ dynes/cm at 20° C.) were used in the production of cellulose triacetate films, fouling deposit occurred on rollers $7_1$, $7_2$ and $7_3$ as soon as the production started.

The fouling deposit grew with time, and after the lapse of two days, the dirt was partly dislodged from roller $7_1$ and transferred onto subsequent rollers $7_2$ and $7_3$ to produce indentations on the film surface. Under these circumstances, the production had to be suspended for cleaning the rollers.

EXAMPLE 1-1

When ceramic rollers ($\sigma=60-70$ dynes/cm at 20° C.) were used in the production of cellulose triacetate films, fouling deposit occurred on rollers $7_1$-$7_3$ as soon as production started, but its severity was not as great as on the stainless steel rollers.

The fouling deposit grew with time, and after the lapse of two weeks, the dirt was partly dislodged from roller $7_1$ and transferred onto subsequent rollers $7_2$ and $7_3$ to produce indentations on the film surface. Under these circumstances, the rollers had to be cleaned every two weeks, but the frequency of those cleaning operations was at last tolerable from the viewpoint of production efficiency.

EXAMPLE 1-2

A polyethylene terephthalate (PET) film 100 μm thick was wrapped around area B of each of the stainless steel transport rollers, thereby reducing their surface energy to about 40 dynes/m at 20° C.

A slight fouling deposit was found to occur on the surface of the PET film, but its growth rate was so slow that, even after the lapse of six months, no particular problems occurred and consistent production of cellulose triacetate films could be accomplished.

EXAMPLE 1-3

The procedure of Example 1-2 was repeated except that transport rollers coated with a fluorine resin ($\sigma$=20-25 dynes/cm at 20° C.) were used. Even after the lapse of six months from the start of production, no fouling deposit occurred on the surface of the transport rollers and consistent production of cellulose triacetate films could be accomplished.

Figure 3B:
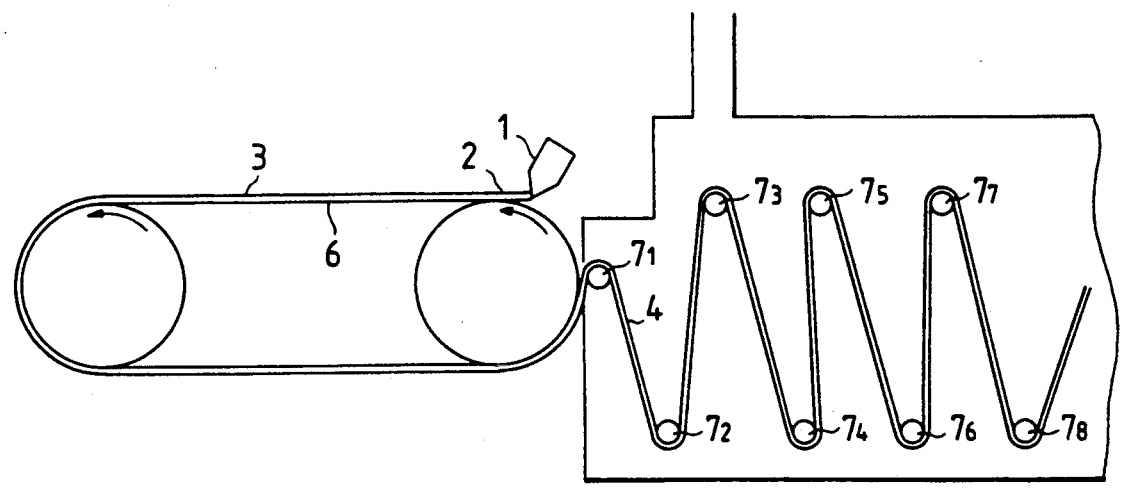
FIG. 3(b) is a side view showing a process of the invention for producing a cellulose triacetate film by casting on a band.

Cellulose triacetate films were produced by a process of the type shown in FIG. 3(b).

Dope:
  Solutes: cellulose triacetate and small amount of plasticizer
  Solvent: liquid mixture of methylene chloride and methanol (92/8 at. wt. ratio)
  Concentration: 20 wt %
  Film thickness: 122 μm (after drying)
  Surface temperature of support: 20° C.
  Average proportion of residual solvents in film as separated from the support: 42.5 wt %
  Materials of transport rollers:
    Rollers $7_1$–$7_3$ had a fluorine resin coat.
    Rollers $7_4$–$7_6$ were made of stainless steel in area C but ceramics in area B.
    Rollers $7_7$ and $7_8$ were made of stainless steel.

Results

No fouling deposit occurred on the surface of rollers $7_1$–$7_3$. Slight fouling deposit was found to occur in area B of rollers $7_4$ and $7_5$, but its growth rate was so slow that even after six months no particular problems occurred and consistent production of cellulose triacetate films could be accomplished.

In the prior art, a cellulose triacetate film that has once solidified on the support and which is subsequently separated from the support to be transferred onto transport rollers will often become viscous again because it is heated by the surface temperature of the transport rollers, and, as a result, any deposit of foreign matter will grow and eventually be deposited on the final film. These phenomena can be effectively prevented by the process of the present invention which takes into account the surface material of the transport rollers.

According to the present invention, plate-out or deposition on rollers of the plasticizer incorporated in the dope together with cellulose triacetate as well as impurities in the cellulose triacetate feed (e.g., long-chain aliphatic acids or esters or metal salts thereof) can also be prevented. Hence, the frequency of cleaning operations is considerably reduced and the production efficiency is markedly improved, thereby accomplishing the production of high-quality cellulose triacetate films at a lower cost and in a consistent manner.

What is claimed is:

1. In a process for producing a cellulose triacetate film that comprises the steps of casting a solution of cellulose triacetate onto a support having its surface cooled at 20° C. or below, drying and cooling the solution cast onto the support to solidify the cast solution, separating the subsequently solidified film from the support, and transporting the film while it dries on transport rollers, the improvement wherein, the average weight proportion of the solvents in the film as separated from the support is at least 40 wt % and the surface of said transport rollers is made of a material having a surface energy of no more than 80 dynes/cm at 20° C., thereby suppressing deposits of foreign matter on said transport rollers.

2. The process for producing a cellulose triacetate film of claim 1, wherein said surface of said transport rollers is made of a material having a surface energy of no more than 50 dynes/cm at 20° C.

3. The process for producing a cellulose triacetate film of claim 1, wherein said surface of the transport rollers is made of a material having a surface energy of no more than 30 dynes/cm at 20° C.

4. The process for producing a cellulose triacetate film of claim 1, wherein said material is a ceramics material.

5. The process for producing a cellulose triacetate film of claim 1, wherein said material is a glass material.

6. The process for producing a cellulose triacetate film of claim 1, wherein said material is a polyethylene terephthalate film.

7. The process for producing a cellulose triacetate film of claim 1, wherein said material is a fluorine resin.

8. The process for producing a cellulose triacetate film of claim 1, wherein said material is applied only to end portions of said surface of said rollers where side edges of said film are transported.

9. The process for producing a cellulose triacetate film of claim 1, wherein a plurality of different materials having a surface energy of no more than 80 dynes/cm at 20° C. are applied across the width of said rollers, the surface energy of said materials varying progressively in accordance with the likelihood of foreign matter being deposited on respective areas of said surface of said rollers.

* * * * *